United States Patent [19]
Palomo et al.

[11] Patent Number: 5,814,714
[45] Date of Patent: Sep. 29, 1998

[54] MONO-OLEFIN/POLYENE INTERPOLYMERS, METHOD OF PREPARATION, COMPOSITIONS CONTAINING THE SAME, AND ARTICLES MADE THEREOF

[75] Inventors: Jesus Nieto Palomo, Cambrils, Spain; Patrick J. C. Schouterden, Wachtebeke, Belgium; Debra Jean Mangold, Lake Jackson, Tex.; Lambertus P. P. M. van der Heijden, Terneuzen, Netherlands; Miguel Garcia Marti, Blankenberge, Belgium

[73] Assignee: The Dow Chemical Company, Midland, Mich.

[21] Appl. No.: 565,329

[22] Filed: Nov. 30, 1995

[51] Int. Cl.$^6$ .............................. C08F 236/20; C08F 4/64
[52] U.S. Cl. .......................... 526/336; 526/126; 526/127; 526/133; 526/134; 526/160; 526/161; 526/170; 526/339; 526/905; 525/232; 524/579; 524/581
[58] Field of Search ..................................... 526/336, 281, 526/308, 160, 170, 126, 127, 133, 134, 153, 161, 339; 525/232; 524/579, 581

[56] References Cited

U.S. PATENT DOCUMENTS

| | | | |
|---|---|---|---|
| 3,291,780 | 12/1966 | Gladding et al. | 260/80.5 |
| 3,819,591 | 6/1974 | Campbell et al. | 260/80.78 |
| 3,984,610 | 10/1976 | Elston | 526/169 |
| 4,668,834 | 5/1987 | Rim et al. | 582/12 |
| 4,931,526 | 6/1990 | Yoshitake et al. | 526/336 |
| 5,272,236 | 12/1993 | Lai et al. | 526/348.5 |
| 5,278,272 | 1/1994 | Lai et al. | 526/348.5 |
| 5,470,993 | 11/1995 | Devore et al. | 556/11 |

FOREIGN PATENT DOCUMENTS

| | | |
|---|---|---|
| 0219166 | 4/1987 | European Pat. Off. . |
| 0273655 | 7/1988 | European Pat. Off. . |
| 0347129 | 12/1989 | European Pat. Off. . |
| 0366290 | 5/1990 | European Pat. Off. . |
| 0416815 | 3/1991 | European Pat. Off. . |
| 0 520 732 | 12/1992 | European Pat. Off. . |
| 0 534 119 | 3/1993 | European Pat. Off. . |
| 0 667 359 | 8/1995 | European Pat. Off. . |
| 93/08221 | 4/1993 | WIPO . |
| 9308222 | 4/1993 | WIPO . |
| 94/07930 | 4/1994 | WIPO . |
| 9413707 | 6/1994 | WIPO . |
| 95/29197 | 11/1995 | WIPO . |
| 95/30698 | 11/1995 | WIPO . |
| 96/12744 | 5/1996 | WIPO . |

*Primary Examiner*—Fred M. Teskin

[57] ABSTRACT

Interpolymer of a) a mono-olefin selected from the group consisting of α-olefins and cyclic olefins, and b) a non-conjugated polyene having at least 7 carbon atoms and having two readily polymerizable double bonds, having an improved melt tension, improved processability, or a combination of both, a process of preparing such interpolymers, composition comprising such interpolymers and one or more further natural or synthetic polymers or one or more additives or adjuvants, as well as articles obtained by subjecting such interpolymers to melt processing conditions.

39 Claims, No Drawings

MONO-OLEFIN/POLYENE INTERPOLYMERS, METHOD OF PREPARATION, COMPOSITIONS CONTAINING THE SAME, AND ARTICLES MADE THEREOF

The present invention relates to interpolymers of a mono-olefin and a polyene having two readily polymerizable bonds, to a process for preparing these, to compositions containing these, as well as to articles obtained by subjecting such interpolymers to melt processing conditions.

BACKGROUND OF THE INVENTION

Olefin-based polymers, especially ethylene polymers and copolymers have been well known for many years. Olefin-based polymers prepared by free radical initiated polymerization processes generally have good processing properties, yet have mechanical properties which are not sufficient for a large number of applications. On the other hand, polymers prepared by transition metal coordination catalysts have many desirable physical properties, yet have rheological characteristics which limit their use in melt processing. Many attempts have been made to modify the properties of olefin-based polymers made by transition metal coordination catalysts using specific comonomers, such as polyenes.

U.S. Pat. No. 3,291,780 mentions polymers prepared from ethylene, an α-olefin, and a non-conjugated hydrocarbon diene, such as dicyclopentadiene, aliphatic α-internal dienes, 5-alkenyl-substututed-2-norbornenes, 5-methylene-2-norbornene, and 2-alkyl-2,5-norbornadienes using coordination catalysts, especially of the vanadium halide, oxyhalide, or OR type wherein the R is an organic radical, cocatalyzed by organoaluminum compounds.

U.S. Pat. No. 3,819,591 discloses sulphur-vulcanizable, chain saturated elastomeric α-olefin copolymers having improved cold flow. These copolymers consist of ethylene, propylene, a non-conjugated diolefin containing only one polymerizable double bond, and a polyolefin containing two polymerizable double bonds. It is mentioned that the latter polyolefins can introduce chain branching into the polymer. The polymers were prepared by using a soluble compound of vanadium in conjunction with an organoaluminum compound.

U.S. Pat. No. 3,984,610 relates to partially crystalline thermoplastic polymers of ethylene, optionally an α-olefin, and a diene selected from the group of alpha, omega dienes of at least 8 carbon atoms and endomethylenic cyclic dienes where each of the two double bonds is readily polymerizable. These polymers were said to have a higher activation energy of viscous flow and a low residual carbon-carbon double bond unsaturation. The activation energy of viscous flow ($E_A$) was said to have a rheological property which is to provide an indication of the change in melt viscosity of the polymer over a certain temperature range. The higher the change, the higher the activation energy. The catalyst used was preferably a compound of vanadium in conjunction with an organoaluminum compound. The process disclosed herein has a relatively low catalyst efficiency.

EP-A-219,166 describes polymers of ethylene, optionally one or more α-olefins, and one or more polyunsaturated compounds with at least 7 carbon atoms and at least two non-conjugated double bonds. The polyunsaturated compound is used in such an amount that the activation energy of the viscous flow is not significantly influenced by it. The amounts of polyunsaturated compounds used were to improve the optical properties without affecting the other properties, such as rheological polymer properties, for example, melt flow index ratio and the viscosity ratio. The catalyst system used was a titanium tetrabutoxide/sesquiethyl aluminumchloride/ethylbutylmagnesium/isopropylchloride system.

EP-A-273,655 discloses uncrosslinked polymers of ethylene, optionally an α-olefin, and 1,5-hexadiene of narrow molecular weight distribution and a narrow compositional distribution of comonomer. The polymer is preferably substantially devoid of long chain branching/intermolecular coupling and has substantially all of the 1,5-hexadiene incorporated in the polymer as a cyclopentane structure. The catalyst system used is a metallocene complex in conjunction with an alumoxane cocatalyst.

EP-A-667,359 discloses olefin copolymers comprising units derived from olefin and units derived from a diolefin having a weight average molecular weight of 200 to 800,000 and a relation between the content of the unit derived from the diolefin in mole percent(DOU) and the total content of the unsaturated group in mole percent (TUS) in a molecular chain is in the range of 0.001 to 200.

EP-416,815 discloses constrained geometry complexes and catalyst systems comprising such a constrained geometry complex and an activating cocatalyst. Conjugated and non-conjugated dienes and polyenes are among the group of addition polymerizable monomers. It also discloses pseudo-random polymers comprising an interpolymer of an olefin and a vinylidene aromatic monomer or of an olefin and a hindered aliphatic vinylidene compound. Divinylbenzene is mentioned as suitable vinylidene aromatic monomer and vinylcyclohexenes are mentioned as suitable hindered aliphatic vinylidene compound.

U.S. Pat. Nos. 5,272,236 and 5,278,272 disclose substantially linear polymers which may be interpolymers of ethylene with at least one $C_{3-20}$ α-olefin and/or $C_{2-20}$ acetylenically unsaturated monomer and/or $C_{4-18}$ diolefins. The substantially linear polymers have processing properties remarkably improved with respect to the traditional linear olefin-based polymers.

U.S. Pat. No. 5,470,993 and WO-9500526 disclose Ti(II) and Zr(II) complexes and addition polymerization catalysts comprising the same. The catalyst may be used to polymerize ethylenically and/or acetylenically unsaturated monomers of 2 to 100 carbon atoms either alone or in combination.

Despite the existing products and processes, there is a desire to provide olefin-based polymers having improved processability or improved melt tension properties, and preferably a combination of both, and further having mechanical and optical properties similar to those of linear olefin-based polymers produced by coordination catalysts. Highly desirably, such olefin-based polymers contain very small amounts of catalyst residues or, in other words, are produced at high catalytic activities or productivities so that catalyst residues do not have to be removed, such as by washing the polymer. Further, it is desired to provide such polymers of improved properties using only very small amounts of the relatively expensive polyene. It would also be desirable to provide such improved polymers over a wide range of densities and especially at relatively lower densities, such as in the range of 0.85 g/cm³ to 0.930 g/cm³.

SUMMARY OF THE INVENTION

The present invention provides an interpolymer of a) a mono-olefin selected from the group consisting of α-olefins and cyclic olefins, and b) a non-conjugated polyene having at least 7 carbon atoms and having two readily polymerizable double bonds, comprising constituent units derived from a) and b);

said interpolymer having a density, d, of from 0.85 to 0.97 g/cm$^3$ as measured in accordance with ASTM D-792;

a melt flow rate, $I_2$, from 0.001 to 50 g/10 min as measured in accordance with ASTM D-1238, Condition 190° C./2.16 kg; and the melt tension of the interpolymer satisfying the following relationship:

$$MT>1.328-0.7879\log(I_2)+22.5(d-0.85)-40.56\{\log(I_2)\}\times(d-0.85)$$

wherein MT represents the melt tension in g.

In a further aspect, there is provided an interpolymer of a) a mono-olefin selected from the group consisting of α-olefins and cyclic olefins, and b) a non-conjugated polyene having at least 7 carbon atoms and having two readily polymerizable double bonds, comprising constituent units derived from a) and b);

said interpolymer having a density, d, of from 0.85 to 0.97 g/cm$^3$ as measured in accordance with ASTM D-792; and a melt flow rate, $I_2$, from 0.001 to 50 g/10 min as measured in accordance with ASTM D-1238, Condition 190° C./2.16 kg;

the interpolymer having a DRI index satisfying the following relationship (i) or (ii):

for interpolymers having an $I_2<8$:
(i) DRI$>7-0.75*I_2$, or
for interpolymers having an $I_2\geq 8$:
(ii) DRI$>1$;

wherein DRI represents the Dow Rheology Index.

According to yet a further aspect, the invention provides a process of preparing an interpolymer of a) a mono-olefin selected from the group consisting of α-olefins and cyclic olefins, and b) a non-conjugated polyene having at least 7 carbon atoms and having two readily polymerizable double bonds, by interpolymerizing in a polymerization reactor the mono-olefin and the polyene in the presence of a transition metal catalyst comprising a transition metal compound containing at least one π-bonded anionic ligand group, wherein the feed to a polymerization reactor comprises the polyene and olefin in a mole ratio of from 0.00005 to 0.3 mole of polyene per mole of olefin.

DETAILED DESCRIPTION OF THE INVENTION

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

The interpolymers according to the present invention have been found to possess surprisingly high melt tension properties and good processability properties and, furthermore, mechanical and optical properties comparable to those of olefin-based linear polymers or interpolymers of the same density and melt flow rate lacking the polyene.

Melt tension is measured by a specially designed pulley transducer in conjunction with a melt indexer. Melt tension is the load that the extrudate or filament exerts while passing over the pulley at the speed of 50 rpm. The melt indexer is operated at 190° C. and the polymer is extruded under a weight of 2160 g through a vertical die with a diameter of 2.1 mm and a length/diameter ratio of 3.82. The molten strand crosses an air gap of 45 cm until it is stretched by a take-up roll gyrating at 50 rpm. The tensile force, or melt tension, required for this stretching is measured by a force cell and expressed in grams. The melt tension measurement is similar to the "Melt Tension Tester" made by Toyoseiki and is described by John Dealy in *Rheometers for Molten Plastics*, published by Van Nostrand Reinhold Co. (1982) on pp. 250–251.

The Dow Rheology Index (DRI) is a processability parameter which characterizes the Theological behavior of the present interpolymers. The DRI has been described earlier as expressing a polymer's "normalized relaxation time as the result of long chain branching". (See, S. Lai and G. W. Knight *ANTEC '93 Proceedings*, INSITE™ Technology Polyolefins (ITP)—New Rules in the Structure/Rheology Relationship of Ethylene α-Olefin Interpolymers, New Orleans, La., May 1993, the disclosure of which is incorporated herein by reference). Before, it was found that DRI values range from 0 for polymers which do not have any measurable long chain branching (e.g. Tafmer™ products available from Mitsui Petrochemical Industries and Exact™ products available from Exxon Chemical Company, Tafmer and Exact polymers being examples of prior art linear low density ethylene interpolymers wherein the α-olefin is homogeneously distributed over the interpolymer) to about 15. In general, for low- to medium-pressure ethylene polymers (particularly at lower densities), DRI provides improved correlations to melt elasticity and high shear flowability relative to correlations of the same attempted with melt flow ratios.

DRI can be calculated from the equation:

$$DRI=(3652879*\tau_o 1.00649/\eta_o-1)/10$$

where $\tau_o$ is the characteristic relaxation time of the material and $\eta_o$ is the zero shear viscosity of the material. Both $\tau_o$ and $\eta_o$ are the "best fit" values to the Cross equation, i.e., $$\eta/\eta_o=1/(1+(\gamma*\tau_o)n)$$

where n is the power law index of the material, and η and γ are the measured viscosity and shear rate, respectively, which best fit values are obtained by a non-linear Gauss-Newton fitting procedure. Baseline determination of viscosity and shear rate data are obtained using a Rheometric Mechanical Spectrometer (RMS-800) under dynamic sweep mode from 0.1 to 100 radians/second at 190° C. and a Gas Extrusion Rheometer (GER) at extrusion pressures from 1000 psi to 5000 psi (6.89 to 34.5 MPa), which corresponds to shear stress from 0.086 to 0.43 MPa, using a 0.0754 mm diameter, 20:1 L/D die at 190° C. Specific material determinations can be performed from 140° C. to 190° C. as required to accommodate melt index variations.

The mono-olefins incorporated in the present interpolymers are α-olefins having from 2 to 20 carbon atoms (including ethylene) and cyclic olefins. Examples of the α-olefins having 3 to 20 carbon atoms include propylene, 1-butene, 3-methyl-1-butene, 1-pentene, 3-methyl-1-pentene, 4-methyl-1-pentene, 1-hexene, 1-heptene, 4,4-dimethyl-1-pentene, 3-ethyl-1-pentene, 1-octene, 1-nonene, 1-decene, 1-dodecene, 1-tetradecene, 1-hexadecene, 1-octadecene and 1-eicosene. Furthermore, the cyclic olefins preferably have 3 to 20 carbon atoms, and typical examples of the cyclic olefins include cyclopentene, cyclohexene, norbornene, 1-methylnorbornene, 5-methylnorbornene, 7-methylnorbornene, 5,6-dimethylnorbornene, 5,5,6-trimethylnorbornene, 5-ethylnorbornene, 5-propylnorbornene, 5-phenylnorbornene, and 5-benzylnorbornene.

Preferably, the α-olefin comprises ethylene and optionally a further α-olefin containing from 3 to 18 carbon atoms. More preferably, the α-olefin comprises ethylene and a further α-olefin containing from 3 to 12 carbon atoms. Especially preferred further α-olefins contain from 4 to 8 carbon atoms, such as 1-butene, 1-pentene, 1-hexene, 4-methyl-1-pentene, and 1-octene.

The term readily polymerizable double bond as used in the present invention in connection with the term polyene means a double carbon-carbon bond which is a terminal carbon-carbon double bond or a carbon-carbon double bond in a strained ring structure. The polyene used in the present invention is a non-conjugated polyene. Preferably, the two readily polymerizable bonds are of about the same or equal reactivity under the polymerization conditions specified herein later.

Preferred non-conjugated polyenes of at least 7 carbon atoms having two readily polymerizable double bonds include straight-chain or branched acyclic diene compounds. Preferably, the polyenes have up to 35 carbon atoms.

Examples of the straight-chain or branched acyclic diene compounds include 1,6-heptadiene, 1,7-octadiene, 1,8-nonadiene, 1,9-decadiene, 1,11-dodecadiene, 1,13-tetradecadiene, and lower alkyl substituted derivatives thereof; examples of the monocyclic alicyclic diene compounds include 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, 1,5-diallylcyclooctane, and lower alkyl substituted derivatives thereof. Other suitable polyenes include bicyclo-(2,2,1)-hepta-2,5-diene (norbornadiene), the dimer of norbornadiene, and diolefins having two strained ring double bonds, such as the reaction product obtained by reacting 2,5-norbornadiene with cyclopentadienyl-1,4,4a,5,8,8a-hexahydro-1,4,5,8-dimethano-naphthalene. Compounds similar but resulting from the addition of more bridged ring units by further condensation with cyclopentadiene can also be used.

The polyenes are used singly or in combination in the polymerization with the monoolefin.

Preferably, the polyene is a diene, advantageously an aliphatic diene, having an olefinic double bond at both terminals, in other words an α-omega diene, containing from 8 to 18 carbon atoms. More preferably, the polyene is an aliphatic α-omega diene containing from 10 to 18 carbon atoms. Interpolymers containing units derived from 1,9-decadiene are highly preferred. Highly preferred are interpolymers comprising units derived from ethylene, from an α-olefin with from 3 to 12 carbon atoms, preferably from 4 to 8 carbon atoms, and from 1,9-decadiene.

Generally, the interpolymers of the present invention have a density of from 0.85 to 0.97 g/cm$^3$, preferably up to 0.96 g/cm$^3$. For interpolymers containing units derived from ethylene and an α-olefin of at least three carbon atoms, the density of the interpolymer is mainly determined by the amount of α-olefin incorporated in the interpolymer. The higher the α-olefin content, the lower the density. Interpolymers wherein the α-olefin comprises ethylene and a further α-olefin containing 3 to 18 carbon atoms preferably have a density of from 0.85 to 0.92 g/cm$^3$, more preferably of from 0.85 to 0.91 g/cm$^3$, most preferably of from 0.86 to 0.89 g/cm$^3$. The amounts of α-olefin other than ethylene included in the interpolymers generally range from 0 mole percent for the interpolymers of about 0.96 g/cm$^3$ to about 17 mole percent for interpolymers of a density of 0.85 g/cm$^3$. For the highly preferred density range of 0.86 to 0.89 g/cm$^3$ the amount of α-olefin is between about 15 and about 5 mole percent. Interpolymers in this highly preferred density range show, besides the melt tension and processability improvements, further improved flexibility, transparancy, and, in general, behave as elastomers.

The polyene in the amounts incorporated in the present interpolymer has a slight effect on the density of the interpolymer in a sense that the density is slightly decreased, typically with 0.001 to 0.02 g/cm$^3$ units. The polyene content is typically not used to adjust the density, but is primarily used to adjust the product properties such as melt tension and processability. It has been found that the incorporation of surprisingly low amounts of polyenes in the present interpolymers is capable of improving greatly the desired properties. Typical polyene contents in the interpolymer range from 0.005 to 0.7 mole percent, preferred polyene content is from 0.02 to 0.2 mole percent. If the polyene content becomes too high, Dart impact strenth and tear strength will deteriorate, and there crosslinking or gel formation may occur. For the highly preferred interpolymers containing 1,9-decadiene units, the preferred polyene content is from 0.02 to 0.19 mole percent, most preferably from 0.02 to 0.1 mole percent. The polyene content can be determined by solution $^{13}$C NMR for those interpolymers not containing other monomers that may interfere with the determination. Such other monomers are monomers that give pendant side chains of more than 5 carbon atoms, such as 1-octene, which gives a hexyl side chain having 6 carbon atoms. For interpolymers of ethylene and polyene and for interpolymers of ethylene, an α-olefin of 3 to 7 carbon atoms, and a polyene, this technique can be used to determine the polyene content. Alternatively and for other interpolymers, the polyene content of the interpolymer can be determined by measuring the amounts or concentration of monomers used (mono-olefin or mono-olefins and polyene) introduced to the reactor and the amounts or concentrations of the same when leaving the reactor. From these data, the composition of the interpolymer can be easily calculated and thus the polyene content determined. The amounts or concentrations of the monomers can be determined by any suitable technique, such as, for example, Fourier Transform Infrared Spectroscopy, Fourier Transform Near Infrared Spectroscopy, or Gas Chromatography.

Alpha, omega aliphatic dienes of lower carbon numbers have been found to have a tendency to be incorporated into the interpolymer as intramolecular rings, i.e., both ends of the diene are reacted into the same polymer backbone. For the improvements in melt tension and processing properties, such intramolecular rings do not contribute significantly, and are therefore not desirable. For example, 1,5-hexadiene is incorporated for a major proportion in the form of intramolecular rings (EP-A-273,655). Intramolecular rings, for example those comprising 6 to 8 ring carbon atoms as may be formed by copolymerizing 1,7-octadiene and ethylene, can be detected by $^{13}$C-NMR spectroscopy, provided that other comonomers are not present in such high quantities that their signals interfere with or obscure the signals of the respective rings. In the preferred interpolymers of the present invention, not more than 15 percent of the polyene is incorporated in the interpolymer as an intramolecular ring, and preferably not more than 5 percent.

It has been found that, under the polymerization conditions described later herein, with increasing polyene carbon number interpolymers are formed containing less intramolecular rings and having remarkably improved properties. Significant proportions of such dienes having higher carbon numbers are not incorporated in ring form but are reacted into different growing polymer backbones and thus form a linkage between two different polymer backbones. This type of linkage may be referred to as "H"-type branching. In case of, for example 1,7-octadiene or 1,9-decadiene, the linking groups between the two polymer chains will be 1,4-butanediyl and 1,6-hexanediyl. In interpolymers of ethylene, optionally a mono-olefin comonomer having not more than 7 carbon atoms and polyenes, the existence of such "H"-type branching can be detected by solution $^{13}$C-NMR spectroscopy. This technique, as described in J. L. Koenig, *Spectroscopy of Polymers*, ACS, Washington, D.C., 1992, can quantify the mole percent content of branches with six or more carbon atoms within the interpolymer (C6+content). The "H"-type branches are not distinguishable, by this technique, from long chain branches originated by the interpolymerization of vinyl-terminated polymer chains into another growing polymer chain. Such type of long chain branching is described in U.S. Pat. No. 5,272,236 and in U.S. Pat. No. 5,278,272 (and the corresponding WO-93/08221), the disclosures of which are herein incorporated by reference. In case the interpolymers contain both H-type branching and long chain branching, the NMR technique provides information on the total number of branching, whether H-type or long chain branching.

The present interpolymers derived from an olefin and a polyene having two readily polymerizable double bonds do not contain substantial amounts of unsaturation. Typically, the amount of residual terminal vinyls is less than 1 terminal vinyl per 1000 carbon atoms in the main chain, preferably less than 0.5 terminal vinyls, as determined with Infrared spectroscopy from the 909 cm$^{-1}$ absorption band. The amount of vinylidene unsaturation in the present interpolymers is typically in the range of 0.01 to 0.5 vinylidenes per 1000 carbon atoms in the main chain. The amount of transvinyl unsaturation in the present interpolymers is typically in the range of 0.01 to 0.3 transvinyls per 1000 carbon atoms in the main chain. The amounts of vinylidene and transvinyl unsaturations are about the same as for similar interpolymers not containing polyenes; the amount of terminal vinyl unsaturation is about the same or slightly higher than that of similar interpolymers not containing polyenes, showing that indeed most of the polyene incorporated in the interpolymer has completely reacted and thus does not leave appreciable amounts of unreacted double bonds.

The interpolymers generally have an $I_2$ generally in the range from 0.001 to 50 g/10 min, preferably from 0.05 to 15 g/10 min, and most preferably from 0.2 to 5 g/10 min. Especially in a solution polymerization process, interpolymers having melt indices of less than 0.05 g/10 min may give highly viscous solutions which limit the rate of production of such polymer and are therefore less desirable. At too high melt indices, the improvements, especially in melt tension, are less pronounced, yet still significantly higher than for polymers having the same melt index yet containing no polyene.

Where melt flow rate values are specified in the present application without giving measurement conditions, the melt index as defined in ASTM D-1238, Condition 190° C./2.16 kg (formerly known as "Condition (E)") is meant. The term melt flow rate may also be referred to as melt index and is inversely proportional to the molecular weight of the polymer. Thus, the higher the molecular weight, the lower the melt index, although the relationship is not linear.

The interpolymers of the present invention generally have a molecular weight distribution, $M_w/M_n$, as determined by gel permeation chromatography from 1.8 to 5. The term molecular weight distribution as used herein, also referred to as "polydispersity", is the weight average molecular weight, $M_w$, divided by the number average molecular weight, $M_n$, and is determined as follows.

The polymer or composition samples are analyzed by gel permeation chromatography (GPC) on a Waters 150C high temperature chromatographic unit equipped with three mixed porosity columns (Polymer Laboratories $10^3$, $10^4$, $10^5$, and $10^6$) operating at a system temperature of 140° C. The solvent is 1,2,4-trichlorobenzene, from which 0.3 percent by weight solution of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polymer molecular weights are determined by using appropriate Mark-Houwink coefficients for polyethylene and polystyrene (as described by Williams and Ward in *Journal of Polymer Science, Polymer Letters*, Vol. 6, (621) 1968, incorporated herein by reference) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_w = \Sigma_i w_i * M_i$, where $w_i$ and $M_i$ are the weight fraction and molecular weight, respectively, of the $i^{th}$ fraction eluting from the GPC column. The highly preferred interpolymers comprising units derived from ethylene, from an α-olefin with from 3 to 12 carbon atoms, preferably from 4 to 8 carbon atoms, and from 1,9-decadiene, preferably have a molecular weight distribution, $M_w/M_n$, from 2.0 to 4.0.

The present interpolymers are different from the prior art linear olefin-based polymers and copolymers and from the prior art substantially linear olefin-based polymers and copolymers in a sense that, at about the same melt index ($MI_2$) and density, the number average molecular weight of the present interpolymer is lower than that of the substantially linear olefin-based polymers and interpolymers which, again, is lower than that of the prior art linear olefin-based polymers and interpolymers.

For the present interpolymers as well as for some prior art substantially linear olefin polymers, the activation energy of viscous flow ($E_A$) has been measured according to the procedure described in U.S. Pat. No. 3,984,610. The values for the prior art polymers were typically between 8 and 12 and for the present interpolymers typically also between 8 and 12. $E_A$ was found to be substantially independent from the melt index for both the prior art and inventive polymers, whereas it was also found to be substantially independent from the polyene content of the present interpolymers. Furthermore, no correlation was found between the improved properties of the present interpolymers and the $E_A$.

Preferably, the present interpolymers have melt tension properties satisfying the following relationship:

$$MT > 1.7705 - 1.0504 \log(I_2) + 30.00(d-0.85) - 54.09\{\log(I_2)\} \times (d-0.85)$$

wherein MT, $I_2$, and d have the definitions given above.

The present interpolymers advantageously have melt tension properties which are at least 35 percent higher, and preferably at least 50 percent higher than the melt tension of a similar polymer of substantially the same density and melt index yet containing no polyene. Interpolymers containing α-omega dienes of at least 10 carbon atoms, such as 1,9-decadiene, can have the same melt tension properties as those containing, for example, alpha-omega dienes of 8 carbon atoms or less, such as, for example, 1,7-octadiene, yet at significantly lower diene contents. In very preferred embodiments, the MT of the present interpolymers approaches or improves that of high pressure, free radical polymerized low density polyethylene (LDPE) having the same melt index.

The present interpolymers alternatively can be characterized by their DRI/melt index relationship. The present interpolymers preferably have DRI values which are at least 0.5 times, more preferably at least 2 times, and most preferably at least 3 times higher than the DRI values of a similar polymer of substantially the same density and melt index yet containing no polyene. Preferably, the DRI of the present interpolymers is at least 2.5, more preferably at least 5.0. As is the case with the melt tension properties, similar improvements in DRI can be obtained by interpolymers containing α-omega dienes of at least 10 carbon atoms, such as 1,9-decadiene, compared to those containing, for example, alpha-omega dienes of 8 carbon atoms or less, yet at significantly lower diene contents. Preferably, the present interpolymers possess both improved melt tension and improved processability properties or, in other words, the present interpolymers preferably satisfy both the melt tension and DRI relationships given above.

An alternative characteristic for the ease with which the present interpolymers can be processed is the viscosity at a shear rate of 316 s$^{-1}$. This is determined as follows. The shear rate versus viscosity curve for the polymer is obtained employing a Rheometrics Mechanical Spectrometer (RMS-80) under dynamic sweep mode from 0.1 to 100 radians/second at a temperature of 190° C. The resulting data are fitted using the least squares criteria with a polynomial equation of the formula $$\log \eta = \sum_{i=0}^{i=3} a_i (\log \gamma)^i$$

wherein τ is the viscosity in Pa.s, γ is the shear rate in s$^{-1}$, and $a_i$ are coefficients which follow from the fitting procedure. The viscosity at a shear rate of 316 s$^{-1}$ (log γ=2.5) is then calculated from this equation. Preferably, the interpolymers of the present invention have a viscosity at 316 s$^{-1}$ ($\tau^{316}$) which meets the following relationship:

log η$^{316}$ ≧ 2.80–0.2861×log($I_2$), and most preferably meets log η$^{316}$ ≧ 2.61–0.2298×log($I_2$).

The interpolymers of the present invention, when derived from a diene which contains only two unsaturated carbon-carbon double bonds which both are readily polymerizable double bonds, do not contain substantial amounts of unsaturation and are generally non-vulcanizable. It will be clear that the benefits of the present invention also apply and can be obtained when it is desired to provide an interpolymer which is vulcanizable.

According to a further aspect of the present invention, such a vulcanizable interpolymer can be provided by either introducing a further polyene in the interpolymer, which further polyene has only one double bond which under the polymerization conditions is readily polymerizable, or by introducing a polyene which, in addition to having two readily polymerizable carbon-carbon double bonds, has an additional double bond which does not readily polymerize. The resulting interpolymer will contain residual unsaturated bonds that can be used for crosslinking or vulcanization purposes, for example by using crosslinking agents such as sulfur, phenolic crosslinkers, and the like. Examplary of such further dienes containing only one readily polymerizable bond include non-conjugated dienes having a) one double bond of the type selected from terminal olefinic bond and a double bond in a strained ring system, and b) one double bond selected from the group consisting of internal, non-terminal double bonds and double bonds in unstrained systems. Examples of such further dienes are 1,4-hexadiene, 5-ethylidene-2-norbornene, 5-vinylidene-2-norbornene, 5-methylene-2-norbornene, and dicyclopentadiene. Examples of a polyene which, in addition to having two readily polymerizable carbon-carbon double bonds, has an additional double bond which does not readily polymerize are 1,4,9-decatriene and 1,4,11-dodecatriene.

The interpolymers of the invention are typically characterized by one DSC melting peak, typically in the range of 60° C. to 130° C., using a differential scanning calorimeter standardized with indium and deionized water. The method involves 5–7 mg samples sizes, a "first heat" to about 150° C. which is held for 4 minutes, a cool down at 10° C./minute to 30° C. which is held for 3 minutes, and heat up at 10° C./minute to 150° C. for the "second heat." The melting peak(s) is taken from the "second heat" heat flow versus temperature curve.

Interpolymers prepared using non-unitary polymerization conditions, i.e., using more than one reaction zone with different polymerization conditions in each zone, or using two different catalytic systems with different polymerization behaviour, or a combination of both, may have more than one DSC melting peak.

The interpolymers of the present invention can be prepared according to a process comprising interpolymerizing in a polymerization reactor the olefin and the polyene in the presence of a transition metal catalyst comprising a transition metal compound containing at least one π-bonded anionic ligand group, wherein the feed to a polymerization reactor comprises the polyene and olefin in a mole ratio of from 0.00005 to 0.3 mole of polyene per mole of olefin. If desired, more than one polyene may be incorporated simultaneously.

Depending on the desired density of the interpolymer, the relative amounts of olefins can be adjusted. For example, for ethylene-based polymers, density can conveniently be adjusted using a further olefin, particularly a further α-olefin. The amount of such other olefin to be used in the polymerization process depends on the amount of olefin to be incorporated into the interpolymer and on the relative reactivities of the ethylene and such other olefin. These relative reactivities can easily be determined and depend on the catalyst system and polymerization conditions used. The amount of α-olefin to be fed to the polymerization reactor varies from 0 mole for a density of about 0.97 g/cm$^3$ to about 0.3 mole of α-olefin per mole of ethylene for a density of 0.85 g/cm$^3$. The catalysts described herein and especially the so-called constrained geometry catalysts are capable of incorporating high amounts of α-olefin into an interpolymer. When producing ethylene-based interpolymers, the ethylene conversion is preferably between 50 and 95 percent, preferbly from 65 to 95 percent, and most preferably from 75 to 92 percent. At too low conversions, the process is not very economic, and at too high conversions, it may be difficult to control the process, as slight variations in monomer concentrations or ratios may have a great influence on the ultimate product. The conversion of the additional α-olefin is typically in the range of 20 to 60 percent.

The amount of polyene used is small compared to the large improvement in product properties. The catalysts decribed herein and especially the constrained geometry type catalyst is very effective in incorporating the polyene into the interpolymer. In order to provide the de sired improvements in melt tension or processing properties, the amount of polyene to be used depends, among other things, on the length of the carbon chain in the polyene. Typically, the mole ratio of 1,7-octadiene to ethylene in the feed to the polymerization reactor is from 0.001 to 0.3 mole of 1,7-octadiene per mole of ethylene, preferably from 0.001 to 0.02, and most preferably from 0.003 to 0.007. Surprisingly, polyenes having at least 10 carbon atoms, for example, 1,9-decadiene, have been found to be much more effective with respect to final polymer properties than lower carbon number polyenes. Typically, the mole ratio of 1,9-decadiene to ethylene in the feed to the polymerization reactor is from 0.00005 to 0.03 mole of 1,9-decadiene per mole of ethylene, preferably from 0.0001 to 0.005, and most preferably from 0.0003 to 0.002. At too high amounts of polyene, gel formation may occur which will lead to less desirable properties. In addition, in a solution polymerization process, too high amounts of polyene lead to increased viscosity of the polymer solution, which is less desirable.

It has been found that only about one-fifth of the molar equivalents of 1,9-decadiene are required to achieve the same level of improvements in melt tension or processing properties than for 1,7-octadiene for ethylene-based interpolymers of a density up to about 0.89 $g/cm^3$. For ethylene-based interpolymers of a density higher than about 0.89 $g/cm^3$, only about one-fifteenth of the molar equivalents of 1,9-decadiene is required for the same properties than with 1,7-octadiene. It has further been found that less unreacted 1,9-decadiene remains with the interpolymer than 1,7-octadiene.

The catalyst system to be used in the present process comprises a transition metal compound containing at least one π-bonded anionic ligand group. Suitable transition metal compounds include derivatives of any transition metal including Lanthanides, but preferably of the Group 3 or 4 transition metals or the Lanthanides which are in the +2, +3, or +4 formal oxidation state and which cary at least one π-bonded anionic ligand group. Preferred compounds include metal complexes containing from 1 to 3 π-bonded anionic ligand groups, which may be cyclic or non-cyclic delocalized π-bonded anionic ligand groups. Exemplary of such π-bonded anionic ligand groups are conjugated or non-conjugated, cyclic or non-cyclic dienyl groups, allyl groups, and arene groups. By the term "π-bonded" is meant that the ligand group is bonded to the transition metal by means of a π-bond.

Each atom in the delocalized π-bonded group may independently be substituted with a radical selected from the group consisting of halogen, hydrocarbyl, halohydrocarbyl, and hydrocarbyl-substituted metalloid radicals wherein the metalloid is selected from Group 14 of the Periodic Table of the Elements. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such radicals may together form a fused ring system or a hydrogenated fused ring system. Suitable hydrocarbyl-substituted organometalloid radicals include mono-, di-and trisubstituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, and decahydroanthracenyl groups, as well as $C_{1-10}$ hydrocarbyl-substituted derivatives thereof. Preferred anionic delocalized π-bonded groups are cyclopentadienyl, pentamethylcyclopentadienyl, tetramethylcyclopentadienyl, indenyl, 2,3-dimethylindenyl, fluorenyl, 2-methylindenyl and 2-methyl-4-phenylindenyl.

Suitable transition metal compounds may be any derivative of any transition metal including Lanthanides, but preferably of the Group 3, 4, or Lanthanide transition metals. More preferred are metal complexes corresponding to the formula:

$L_1MX_mX'_nX''_p$, or a dimer thereof wherein:

L is an anionic, delocalized, π-bonded group that is bound to M, containing up to 50 non-hydrogen atoms, optionally two L groups may be joined together forming a bridged structure, and further optionally one L may be bound to X;

M is a metal of Group 4 of the Periodic Table of the Elements in the +2, +3 or +4 formal oxidation state;

X is an optional divalent substituent of up to 50 non-hydrogen atoms that, together with L, forms a metallocycle with M;

X' is an optional neutral Lewis base having up to 20 non-hydrogen atoms;

X" each occurrence is a monovalent, anionic moiety having up to 40 non-hydrogen atoms, optionally, two X" groups may be covalently bound together forming a divalent dianionic moiety having both valences bound to M, or form a neutral, conjugated or non-conjugated diene that is π-bonded to M (whereupon M is in the +2 oxidation state), or further optionally, one or more X" and one or more X' groups may be bonded together, thereby forming a moiety that is both covalently bound to M and coordinated thereto by means of Lewis base functionality;

l is 1 or 2 or 3;

m is 0 or 1;

n is a number from 0 to 3;

p is an integer from 0 to 3; and the sum, l+m+p, is equal to the formal oxidation state of M.

Preferred complexes include those containing either one or two L groups. The latter complexes include those containing a bridging group linking the two L groups. Preferred bridging groups are those corresponding to the formula $(ER^*_2)_x$, wherein E is silicon or carbon, R* independently each occurrence is hydrogen or a group selected from silyl, hydrocarbyl, hydrocarbyloxy and combinations thereof, said R* having up to 30 carbon or silicon atoms, and x is 1 to 8. Preferably, R* independently each occurrence is methyl, benzyl, tert-butyl, ethoxy, propoxy, 2-butoxy or phenyl.

Examples of the foregoing bis(L)-containing complexes are compounds corresponding to the formula (A) or (B):

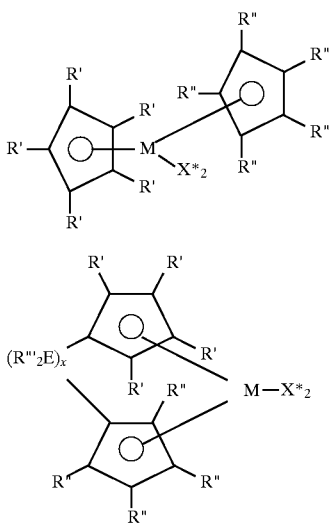

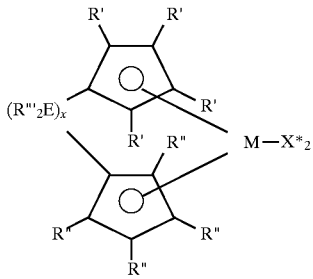

wherein:

M is titanium, zirconium or hafnium, preferably zirconium or hafnium, in the +2 or +4 formal oxidation state;

R' and R" in each occurrence independently are selected from the group consisting of hydrogen, hydrocarbyl, silyl, germyl, cyano, halo and combinations thereof, said R' or R" having up to 20 non-hydrogen atoms, or adjacent R' or R" groups together form a divalent derivative (i.e., a hydrocarbadiyl, siladiyl or germadiyl group) thereby forming a fused ring system;

X* independently each occurrence is an anionic ligand group of up to 40 non-hydrogen atoms, or two X* groups together form a divalent anionic ligand group of up to 40 non-hydrogen atoms or together are a conjugated diene having from 4 to 30 non-hydrogen atoms forming a π-complex with M, whereupon M is in the +2 formal oxidation state; and R*, E and x are as previously defined.

The foregoing metal complexes are especially suited for the preparation of polymers having stereoregular molecular structure. In such capacity, it is preferred that the complex possess Cs symmetry or possess a chiral, stereorigid structure. Examples of the first type are compounds possessing different delocalized p-bonded systems, such as one cyclopentadienyl group and one fluorenyl group. Similar systems based on Ti(IV) or Zr(IV) were disclosed for preparation of syndiotactic olefin polymers in Ewen et al., *J. Am. Chem. Soc.*, 110, 6255–6256 (1980). Examples of chiral structures include bis-indenyl complexes. Similar systems based on Ti(IV) or Zr(IV) were disclosed for preparation of isotactic olefin polymers in Wild et al., *J. Organomet. Chem.*, 232, 233–47, (1982).

Exemplary bridged ligands containing two π-bonded groups are: (dimethylsilyl-bis-cyclopentadienyl), (dimethylsilyl-bis-methylcyclopentadienyl), (dimethylsilyl-bis-ethylcyclopentadienyl), (dimethylsilyl-bis-t-butylcyclopentadienyl), (dimethylsilyl-bis-tetramethylcyclopentadienyl), (dimethylsilyl-bis-indenyl), (dimethylsilyl-bis-tetrahydroindenyl), (dimethylsilyl-bis-fluorenyl), (dimethylsilyl-bis-tetrahydrofluorenyl), (dimethylsilyl-bis-2-methyl-4-phenylindenyl), (dimethylsilyl-bis-2-methylindenyl), (dimethylsilyl-cyclopentadienyl-fluorenyl), (1,1,2,2-tetramethyl-1,2-disilyl-bis-cyclopentadienyl), (1,2-bis(cyclopentadienyl) ethane, and (isopropylidene-cyclopentadienyl-fluorenyl).

Preferred X* groups are selected from hydride, hydrocarbyl, silyl, germyl, halohydrocarbyl, halosilyl, silyl-hydrocarbyl and aminohydrocarbyl groups, or two X* groups together form a divalent derivative of a conjugated diene or else together they form a neutral, π-bonded, conjugated diene. Most preferred X* groups are $C_{1-20}$ hydrocarbyl groups.

Suitable divalent X* substituents preferably include groups containing up to 30 non-hydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur, that is covalently bonded to M.

A further class of metal complexes utilized in the present invention correspond to the formula:

$L_lMX_mX'_nX''_p$, or a dimer thereof wherein:

L is an anionic, delocalized, π-bonded group that is bound to M, containing up to 50 non-hydrogen atoms;

M is a metal of Group 4 of the Periodic Table of the Elements in the +2, +3 or +4 formal oxidation state;

X is a divalent substituent of up to 50 non-hydrogen atoms that, together with L, forms a metallocycle with M;

X' is an optional neutral Lewis base ligand having up to 20 non-hydrogen atoms;

X" each occurrence is a monovalent, anionic moiety having up to 20 non-hydrogen atoms, optionally two X" groups together may form a divalent anionic moiety having both valences bound to M or a neutral $C_{5-30}$ conjugated diene, and further optionally, X' and X" may be bonded together, thereby forming a moiety that is both covalently bound to M and coordinated thereto by means of Lewis base functionality;

l is 1 or 2;

m is 1;

n is a number from 0 to 3;

p is an integer from 1 to 2; and the sum, l+m+p, is equal to the formal oxidation state of M.

A preferred class of such Group 4 metal coordination complexes used according to the present invention correspond to the formula:

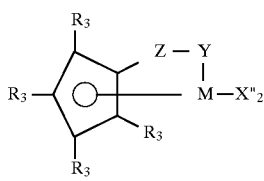

wherein:

M is titanium or zirconium in the +2 or +4 formal oxidation state;

$R_3$ in each occurrence independently is selected from the group consisting of hydrogen, hydrocarbyl, silyl, germyl, cyano, halo and combinations thereof, said $R_3$ having up to 20 non-hydrogen atoms, or adjacent $R_3$ groups together form a divalent derivative (i.e., a hydrocarbadiyl, siladiyl or germadiyl group) thereby forming a fused ring system;

each X" is a halo, hydrocarbyl, hydrocarbyloxy or silyl group, said group having up to 20 non-hydrogen atoms, or two X" groups together form a $C_{5-30}$ conjugated diene;

Y is —O—, —S—, —NR*—, —PR*—; and

Z is SiR*$_2$, CR*$_2$, SiR*$_2$SiR*$_2$, CR*$_2$CR*$_2$, CR*=CR*, CR*$_2$SiR*$_2$, or GeR*$_2$, wherein: R* is as previously defined.

Illustrative Group 4 metal complexes that may be employed in the practice of the present invention include: cyclopentadienyltitaniumtrimethyl, cyclopentadienyltitaniumtriethyl, dienyltitaniumtriethyl, cyclopentadienyltitaniumtriisopropyl, cyclopentadienyltitaniumtribenzyl, cyclopentadienyltitanium-2,4-pentadienyl, cyclopentadienyltitaniumdimethylmethoxide, cyclopentaienyltitaniumdimethylchloride, pentamethylcyclopentadienyltitaniumtrimethyl, indenyltitaniumtrimethyl, indenyltitaniumtriethyl, indenyltitaniumtripropyl, indenyltitaniumtriphenyl, tetrahydroindenyltitaniumtribenzyl, pentamethylcyclopentadienyltitaniumtriisopropyl, pentamethylcyclopentadienyltitaniumtribenzyl, pentamethylcyclopentadienyltitaniumdimethylmethoxide, pentamethylcyclopentadienyltitaniumdimethylchloride, ($\eta^5$-2,4-dimethyl-1,3-pentadienyl)titaniumtrimethyl, octahydrofluorenyltitaniumtrimethyl, tetrahydroindenyltitaniumtrimethyl, tetrahydrofluorenyltitaniumtrimethyl, (1,1-dimethyl-2,3,4,9,9,10-$\eta$-1,4,5,6, 7,8-hexahydronaphthalenyl) titaniumtrimethyl, (1,1,2,3-tetramethyl-2,3,4, 9,10-$\eta$-1,4,5,6,7,8-hexahydronaphthalenyl)titaniumtrimethyl, (tert-butylamido)(tetramethyl-$\eta^5$-cyclopentadienyl) dimethylsilanetitanium dichloride, (tert-butylamido) (tetramethyl-$\eta^5$-cyclopentadienyl)-dimethylsilanetitanium dimethyl, (tert-butylamido) (tetramethyl-$\eta^5$-cyclopentadienyl)-1,2-ethanediyltitanium dimethyl, (tert-butylamido)(tetramethyl-$\eta^5$-indenyl) dimethylsilanetitanium dimethyl, (tert-butylamido)(tetramethyl-$\eta^5$-cyclopentadienyl) dimethylsilane titanium (III) 2-(dimethylamino)benzyl, (tert-butylamido) (tetramethyl-$\eta^5$-cyclopentadienyl) dimethylsilanetitanium (III) allyl, (tert-butylamido)(tetramethyl-$\eta^5$-cyclopentadienyl)-dimethylsilanetitanium (II) 1,4-diphenyl-1,3-butadiene, (tert-butylamido)(2-methylindenyl)dimethylsilanetitanium (II) 1,4-diphenyl-1,3-butadiene, (tert-butylamido)(2-methylindenyl)dimethylsilanetitanium (IV) 1,3-butadiene, (tert-butylamido)(2,3-dimethylindenyl) dimethylsilanetitanium (II) 1,4-diphenyl-1,3-butadiene, (tert-butylamido)(2,3-dimethylindenyl) dimethylsilanetitanium (IV) 1,3-butadiene, (tert-butylamido)(2,3-dimethylindenyl)dimethylsilanetitanium (II) 1,3-pentadiene, (tert-butylamido)(2-methylindenyl) dimethylsilanetitanium (II) 1,3-pentadiene, (tert-butylamido)(2-methylindenyl)dimethylsilanetitanium (IV) dimethyl, (tert-butylamido) (2-methyl-4-phenylindenyl) dimethylsilanetitanium (II) 1,4-diphenyl-1,3-butadiene, (tert-butylamido)(tetramethyl-$\eta^5$-cyclopentadienyl)-dimethylsilanetitanium (IV) 1,3-butadiene, (tert-butylamido) (tetramethyl-$\eta^5$-cyclopentadienyl)-dimethylsilanetitanium (II) 1,4-dibenzyl-1,3-butadiene, (tert-butylamido)(tetramethyl-$\eta^5$-cyclopentadienyl) dimethylsilanetitanium (II) 2,4-hexadiene, (tert-butylamido) (tetramethyl-$\eta^5$-cyclopentadienyl) dimethylsilanetitanium (II) 3-methyl-1,3-pentadiene, (tert-butylamido)(2,4-dimethyl-1,3-pentadien-2-yl) dimethylsilanetitaniumdimethyl, (tert-butylamido)(1,1-dimethyl-2,3,4,9,10-$\eta$-1,4,5,6, 7,8-hexahydronaphthalen-4-yl) dimethylsilanetitaniumdimethyl, and (tert-butylamido) (1,1,2,3-tetramethyl-2,3,4,9,10-$\eta$-1,4,5,6, 7,8-hexahydronaphthalen-4-yl)dimethylsilanetitanium dimethyl.

Bis(L)-containing complexes including bridged complexes suitable for use in the present invention include: biscyclopentadienylzirconiumdimethyl, biscyclopentadienyltitaniumdiethyl, biscyclopentadienyltitaniumdiisopropyl, biscyclopentadienyltitaniumdiphenyl, biscyclopentadienylzirconiumdibenzyl, biscyclopentadienyltitanium-2,4-pentadienyl, biscyclopentadienyltitaniummethylmethoxide, biscyclopentadienyltitaniummethylchloride, bispentamethylcyclopentadienyltitaniumdimethyl, bisindenyltitaniumdimethyl, indenylfluorenyltitaniumdiethyl, bisindenyltitaniummethyl (2-(dimethylamino)benzyl), bisindenyltitaniummethyltrimethylsilyl, bistetrahydroindenyltitaniummethyltrimethylsilyl, bispentamethylcyclopentadienyltitaniumdiisopropyl, bispentamethylcyclopentadienyltitaniumdibenzyl, bispentamethylcyclopentadienyltitaniummethylmethoxide, bispentamethylcyclopentadienyltitaniummethylchloride, (dimethylsilyl-bis-cyclopentadienyl)zirconiumdimethyl, (dimethylsilyl-bis-pentamethylcyclopentadienyl) titanium-2,4-pentadienyl, (dimethylsilyl-bis-t-butylcyclopentadienyl) zirconium dichloride, (methylene-bis-pentamethylcyclopentadienyl)titanium(III) 2-(dimethylamino)benzyl, (dimethylsilyl-bis-indenyl) zirconiumdichloride, (dimethylsilyl-bis-2-methylindenyl) zirconiumdimethyl, (dimethylsilyl-bis-2-methyl-4-phenylindenyl)zirconium dimethyl, (dimethylsilyl-bis-2-methylindenyl) zirconium-1,4-diphenyl-1,3-butadiene, (dimethylsilyl-bis-2-methyl-4-phenylindenyl) zirconium (II) 1,4-diphenyl-1,3-butadiene, (dimethylsilyl-bistetrahydroindenyl)zirconium(II) 1,4-diphenyl-1,3-butadiene, (dimethylsilyl-bis-fluorenyl) zirconiumdichloride, (dimethylsilyl-bis-tetrahydrofluorenyl)zirconium di(trimethylsilyl), (isopropylidene)(cyclopentadienyl)(fluorenyl)zirconium dibenzyl, and (dimethylsilylpentamethylcyclopentadienylfluorenyl)-zirconium dimethyl.

Other compounds which are useful in the catalyst systems, especially compounds containing other Group 4 metals, will, of course, be apparent to those skilled in the art.

The complexes are rendered catalytically active by combination with an activating cocatalyst or by use of an activating technique. Suitable activating cocatalysts for use herein include polymeric or oligomeric alumoxanes, especially methylalumoxane, triisobutyl aluminum modified methylalumoxane, or isobutylalumoxane; neutral Lewis acids, such as $C_{1-30}$ hydrocarbyl substituted Group 13 compounds, especially tri(hydrocarbyl)aluminum or tri (hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluorophenyl) borane; non-polymeric, compatible, non-coordinating, ion-forming compounds (including the use of such compounds under oxidizing conditions), especially the use of ammonium, phosphonium, oxonium, carbonium, silylium or sulfonium salts of compatible, non-coordinating anions, or ferrocenium salts of compatible, non-coordinating anions; bulk electrolysis (explained in more detail hereinafter); and combinations of the foregoing activating cocatalysts and techniques. The foregoing activating cocatalysts and activating techniques have been previously taught with respect to different metal complexes in the following references:

EP-A-277,003, U.S. Pat. No. 5,153,157, U.S. Pat. No. 5,064,802, EP-A-468,651 (equivalent to U.S. application Ser. No. 07/547,718), EP-A-520,732 (equivalent to U.S. application Ser. No. 07/876,268), EP-A-520,732 (equivalent to U.S. application Ser. No. 07/884,966 filed May 1, 1992), and U.S. Pat. No. 5,470,993, the teachings of which are hereby incorporated by reference.

Combinations of neutral Lewis acids, especially the combination of a trialkyl aluminum compound having from 1 to 4 carbons in each alkyl group and a halogenated tri (hydrocarbyl)boron compound having from 1 to 20 carbons in each hydrocarbyl group, especially tris (pentafluorophenyl)borane, further combinations of such neutral Lewis acid mixtures with a polymeric or oligomeric alumoxane, and combinations of a single neutral Lewis acid, especially tris(pentafluorophenyl)borane with a polymeric or oligomeric alumoxane, are especially desirable activating cocatalysts.

Suitable ion-forming compounds useful as cocatalysts comprise a cation which is a Bronsted acid capable of donating a proton, and a compatible, non-coordinating anion, A–. As used herein, the term "non-coordinating" means an anion or substance which either does not coordinate to the Group 4 metal containing precursor complex and the catalytic derivative derived therefrom, or which is only weakly coordinated to such complexes, thereby remaining sufficiently labile to be displaced by a neutral Lewis base. A non-coordinating anion specifically refers to an anion which, when functioning as a charge balancing anion in a cationic metal complex, does not transfer an anionic substituent or fragment thereof to said cation, thereby forming neutral complexes. "Compatible anions" are anions which are not degraded to neutrality when the initially formed complex decomposes and are non-interfering with desired subsequent polymerization or other uses of the complex.

Preferred anions are those containing a single coordination complex comprising a charge-bearing metal or metalloid core, which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably, such cocatalysts may be represented by the following general formula:

(L*–H)$d^+$(A)$d-$ wherein:
L* is a neutral Lewis base;
(L*–H)$^+$ is a Bronsted acid;
A$^{d-}$ is a non-coordinating, compatible anion having a charge of d–, and
d is an integer from 1 to 3.
More preferably, A$^{d-}$ corresponds to the formula:
[M'Q$_4$]$^-$;
wherein:
M' is boron or aluminum in the +3 formal oxidation state; and Q independently each occurrence is selected from hydride, dialkylamido, halide, hydrocarbyl, hydrocarbyloxide, halosubstituted hydrocarbyl, halosubstituted hydrocarbyloxy, and halosubstituted silylhydrocarbyl radicals (including perhalogenated hydrocarbyl perhalogenated hydrocarbyloxy and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433, the teachings of which are herein incorporated by reference.

In a more preferred embodiment, d is one, that is, the counterion has a single negative charge and is A–. Activating cocatalysts comprising boron which are particularly useful in the preparation of catalysts of this invention may be represented by the following general formula:

(L*–H)$^+$(BQ$_4$)$^-$;

wherein:
L* is as previously defined;
B is boron in a formal oxidation state of 3; and
Q is a hydrocarbyl, hydrocarbyloxy, fluorinated hydrocarbyl, fluorinated hydrocarbyloxy, or fluorinated silylhydrocarbyl group of up to 20 non-hydrogen atoms, with the proviso that in not more than one occasion is Q hydrocarbyl.

Most preferably, Q is each occurrence a fluorinated aryl group, especially a pentafluorophenyl group.

Illustrative, but not limiting, examples of boron compounds which may be used as an activating cocatalyst in the preparation of the catalysts are tri-substituted ammonium salts such as: trimethylammonium tetrakis (pentafluorophenyl) borate, triethylammonium tetrakis (pentafluorophenyl) borate, tripropylammonium tetrakis (pentafluorophenyl) borate, tri(n-butyl)ammonium tetrakis (pentafluorophenyl) borate, tri(sec-butyl)ammonium tetrakis(pentafluorophenyl) borate, N,N-dimethylanilinium tetrakis(pentafluorophenyl) borate, N,N-dimethylanilinium n-butyltris(pentafluorophenyl) borate, N,N-dimethylanilinium benzyltris(pentafluorophenyl) borate, N,N-dimethylanilinium tetrakis(4-(t-butyldimethylsilyl)-2,3, 5,6-tetrafluorophenyl) borate, N,N-dimethylanilinium tetrakis(4-(tri-isopropylsilyl)-2,3, 5,6-tetrafluorophenyl) borate, N,N-dimethylanilinium pentafluorophenoxytris (penta-fluorophenyl) borate, N,N-diethylanilinium tetrakis (pentafluorophenyl) borate, N,N-dimethyl-2,4,6-trimethylanilinium tetrakis(pentafluorophenyl) borate, trimethylammonium tetrakis(2,3, 4,6-tetrafluorophenyl) borate, triethylammonium tetrakis(2,3, 4,6-tetrafluorophenyl) borate, tripropylammonium tetrakis-(2,3, 4,6-tetrafluorophenyl) borate, tri(n-butyl)ammonium tetrakis(2,3,4,6-tetrafluorophenyl) borate, dimethyl(t-butyl) ammonium tetrakis(2,3, 4,6-tetrafluorophenyl) borate, N,N-dimethylanilinium tetrakis-(2,3,4,6-tetrafluorophenyl) borate, N,N-diethylanilinium tetrakis(2,3,4,6-tetrafluorophenyl) borate, and N,N-dimethyl-2,4,6-trimethylanilinium tetrakis-(2,3,4,6-tetrafluorophenyl) borate; dialkyl ammonium salts such as: di-(i-propyl) ammonium tetrakis(pentafluorophenyl) borate, and dicyclohexylammonium tetrakis(pentafluorophenyl) borate; tri-substituted phosphonium salts such as: triphenylphosphonium tetrakis(pentafluorophenyl) borate, tri(o-tolyl)-phosphonium tetrakis(pentafluorophenyl) borate, and tri(2,6-dimethylphenyl)phosphonium tetrakis (pentafluorophenyl) borate; di-substituted oxonium salts such as: diphenyloxonium tetrakis(pentafluorophenyl) borate, di(o-tolyl)oxonium tetrakis(pentafluorophenyl)

borate, and di(2,6-dimethylphenyl)oxonium tetrakis (pentafluorophenyl) borate; di-substituted sulfonium salts such as: diphenylsulfonium tetrakis(pentafluorophenyl) borate, di(o-tolyl)sulfonium tetrakis(pentafluorophenyl) borate, and bis(2,6-dimethylphenyl)sulfonium tetrakis (pentafluorophenyl) borate.

Preferred $(L^*-H)^+$ cations are N,N-dimethylanilinium and tributylammonium.

Another suitable ion-forming, activating cocatalyst comprises a salt of a cationic oxidizing agent and a non-coordinating, compatible anion represented by the formula: $(Ox^{e+})_d(A^{d-})_e$ wherein: $Ox^{e+}$ is a cationic oxidizing agent having a charge of $e^+$; e is an integer from 1 to 3; and $A^{d-}$ and d are as previously defined.

Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activating cocatalysts, especially tetrakis (pentafluorophenyl)borate.

Another suitable ion-forming, activating cocatalyst comprises a compound which is a salt of a carbenium ion and a non-coordinating, compatible anion represented by the formula: $©^+ A^-$ wherein: $©^+$ is a $C_{1-20}$ carbenium ion and $A^-$ is as previously defined. A preferred carbenium ion is the trityl cation, i.e., triphenylmethylium.

A further suitable ion-forming, activating cocatalyst comprises a compound which is a salt of a silylium ion and a non-coordinating, compatible anion represented by the formula: $R_3Si(X')_q^+A^-$, wherein: R is $C_{1-10}$ hydrocarbyl, and X', q and $A^-$ are as previously defined.

Preferred silylium salt activating cocatalysts are trimethylsilylium tetrakis(pentafluorophenyl) borate, triethylsilylium tetrakis(pentafluorophenyl) borate and ether-substituted adducts thereof. Silylium salts have been previously generically disclosed in *J. Chem Soc., Chem. Comm.*, 1993, 383–384, as well as Lambert, J. B., et al., *Organometallics*, 1994, 13, 2430–2443. The use of the above silylium salts as activating cocatalysts for addition polymerization catalysts is claimed in U.S. application Ser. No. 08/304,315, filed Sep. 12, 1994, issued as U.S. Pat. No. 5,495,036, incorporated herein by reference.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433, the teachings of which are herein incorporated by reference.

The technique of bulk electrolysis involves the electrochemical oxidation of the metal complex under electrolysis conditions in the presence of a supporting electrolyte comprising a non-coordinating, inert anion. In the technique, solvents, supporting electrolytes and electrolytic potentials for the electrolysis are used such that electrolysis by-products that would render the metal complex catalytically inactive are not substantially formed during the reaction. More particularly, suitable solvents are materials that are: liquids under the conditions of the electrolysis (generally temperatures from 0° C. to 100° C.), capable of dissolving the supporting electrolyte, and inert. "Inert solvents" are those that are not reduced or oxidized under the reaction conditions employed for the electrolysis. It is generally possible, in view of the desired electrolysis reaction, to choose a solvent and a supporting electrolyte that are unaffected by the electrical potential used for the desired electrolysis. Preferred solvents include difluorobenzene (all isomers), dimethoxyethane (DME), and mixtures thereof.

The electrolysis may be conducted in a standard electrolytic cell containing an anode and cathode (also referred to as the working electrode and counter-electrode, respectively). Suitable materials of construction for the cell are glass, plastic, ceramic and glass-coated metal. The electrodes are prepared from inert conductive materials, by which are meant conductive materials that are unaffected by the reaction mixture or reaction conditions. Platinum or palladium are preferred inert conductive materials. Normally an ion-permeable membrane such as a fine glass frit separates the cell into separate compartments, the working electrode compartment and counterelectrode compartment. The working electrode is immersed in a reaction medium comprising the metal complex to be activated, solvent, supporting electrolyte, and any other materials desired for moderating the electrolysis or stabilizing the resulting complex. The counter-electrode is immersed in a mixture of the solvent and supporting electrolyte. The desired voltage may be determined by theoretical calculations or experimentally by sweeping the cell using a reference electrode such as a silver electrode immersed in the cell electrolyte. The background cell current, the current draw in the absence of the desired electrolysis, is also determined. The electrolysis is completed when the current drops from the desired level to the background level. In this manner, complete conversion of the initial metal complex can be easily detected.

Suitable supporting electrolytes are salts comprising a cation and a compatible, non-coordinating anion, $A^-$. Preferred supporting electrolytes are salts corresponding to the formula $G^+A^-$; wherein:

$G^+$ is a cation which is non-reactive towards the starting and resulting complex, and $A^-$ is as previously defined.

Examples of cations, $G^+$, include tetrahydrocarbyl-substituted ammonium or phosphonium cations having up to 40 non-hydrogen atoms. Preferred cations are the tetra(n-butylammonium) and tetraethylammonium cations.

During activation of the complexes of the present invention by bulk electrolysis, the cation of the supporting electrolyte passes to the counter-electrode and $A^-$ migrates to the working electrode to become the anion of the resulting oxidized product. Either the solvent or the cation of the supporting electrolyte is reduced at the counterelectrode in equal molar quantity with the amount of oxidized metal complex formed at the working electrode. Preferred supporting electrolytes are tetrahydrocarbylammonium salts of tetrakis(perfluoroaryl) borates having from 1 to 10 carbons in each hydrocarbyl or perfluoroaryl group, especially tetra (n-butylammonium) tetrakis(pentafluorophenyl) borate.

A further recently discovered electrochemical technique for generation of activating cocatalysts is the electrolysis of a disilane compound in the presence of a source of a non-coordinating compatible anion. This technique is more fully disclosed and claimed in the previously mentioned U.S. Application Ser. No. 08/304,315, filed on Sep. 12, 1994.

The foregoing electrochemical activating technique and activating cocatalysts may also be used in combination. An especially preferred combination is a mixture of a tri (hydrocarbyl)aluminum or tri(hydrocarbyl)borane compound having from 1 to 4 carbons in each hydrocarbyl group with an oligomeric or polymeric alumoxane compound.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, is employed in large quantity, generally at least 100 times the quantity of metal complex on a molar basis. Tris (pentafluorophenyl) borane, where used as an activating cocatalyst is employed in a molar ratio to the metal complex of from 0.5:1 to 10:1, more preferably from 1:1 to 6:1, most preferably from 1:1 to 5:1. The remaining activating cocatalysts are generally employed in approximately equimolar quantity with the metal complex. A most preferred activating cocatalyst comprises both a strong Lewis acid and an alumoxane, especially tris(pentafluorophenyl)borane and methylalumoxane, modified methylalumoxane, or diisobutylalumoxane. Preferred molar ratios of transition metal complex:tris(pentafluorophenyl)borane:alumoxane are from 1:1:1 to 1:5:20, more preferably from 1:1:1.5 to 1:5:15. The use of lower levels of alumoxane for the production of olefin polymers with high catalytic efficiencies requires less of the expensive alumoxane and provides polymers with lower levels of aluminum residue and, hence, greater clarity.

In a particularly preferred embodiment of the invention, the cocatalyst can be used in combination with a tri (hydrocarbyl)aluminum compound having from 1 to 10 carbons in each hydrocarbyl group or an oligomeric or polymeric alumoxane. It is possible to employ these aluminum compounds for their beneficial ability to scavenge impurities such as oxygen, water, and aldehydes from the polymerization mixture. Preferred aluminum compounds include trialkyl aluminum compounds having from 2 to 6 carbons in each alkyl group, especially those wherein the alkyl groups are ethyl, propyl, isopropyl, n-butyl, isobutyl, pentyl, neopentyl, or isopentyl, and methylalumoxane, modified methylalumoxane (that is, methylalumoxane modified by reaction with triisobutyl aluminum) (MMAO) and diisobutylalumoxane. The molar ratio of aluminum compound to metal complex is preferably from 1:10,000 to 1000:1, more preferably from 1:5000 to 100:1, most preferably from 1:100 to 100:1.

The catalyst system may be prepared as a homogeneous catalyst by addition of the requisite components to a solvent. The catalyst system may also be prepared and employed as a heterogeneous catalyst by depositing the requisite components on a catalyst support material. A support, especially silica, modified silica (silica modified by calcining, treatment with a trialkylaluminum compound having from 1 to 10 carbons in each alkyl group, or treatment with an alkylalumoxane), alumina, or a polymer (especially polytetrafluoroethylene or a polyolefin) or other suitable inorganic or organic support material, may be employed, and desirably is employed when the catalysts are used in a slurry or gas phase polymerization process. The support is preferably employed in an amount to provide a weight ratio of catalyst (based on metal) to support from 1:100,000 to 1:10, more preferably from 1:50,000 to 1:20, and most preferably from 1:10,000 to 1:30. When prepared in heterogeneous or supported form, it is preferred to use silica as the support material.

In general, the polymerization may be accomplished at conditions well known in the prior art for Ziegler-Natta or Kaminsky-Sinn type polymerization reactions, i.e., temperatures from 0° C. to 250° C. and pressures from atmospheric to 2000 atmospheres (0.1 to 100 MPa) and above. Suspension, solution, slurry, gas phase or other process conditions may be employed if desired. Preferred are the solution, gas phase, or slurry polymerization processes. Most preferred is the solution process.

Depending on the type of polymerization process, suitable solvents or diluents to be used are non-coordinating, inert liquids. In solution polymerization conditions, a solvent is used for the respective components of the reaction, particularly the interpolymer produced. Preferred solvents include mineral oils and the various hydrocarbons which are liquid at reaction temperatures. Illustrative examples of useful solvents include straight- and branched-chain hydrocarbons such as alkanes, e.g., isobutane, butane, pentane, isopentane, hexane, heptane, octane and nonane, as well as mixtures of alkanes including kerosene and Isopar E™, available from Exxon Chemicals Inc.; cyclic and alicyclic hydrocarbons such as cyclopentane, cyclohexane, cycloheptane, methylcyclohexane, methylcycloheptane, and mixtures thereof; and aromatics and alkyl-substituted aromatic compounds such as benzere, toluene, xylenes, ethylbenzene, diethylbenzene, and the like; and perfluorinated hydrocarbons such as perfluorinated $C_{4-10}$ alkanes. Suitable solvents also include liquid olefins which may act as monomers or comonomers. Mixtures of the foregoing are also suitable.

Slurry polymerization takes place in liquid diluents and under conditions in which the polymer product is substantially insoluble in the diluent. Preferably, the diluent for slurry polymerization is a hydrocarbon, preferably a saturated aliphatic or cycloaliphatic hydrocarbon of at least 3, more preferably at least 4 carbon atoms. Likewise, the α-olefin monomer or a mixture of different α-olefin monomers may be used in whole or part as the diluent. Typical operating conditions for slurry polymerizations are from 0° C. to 120° C., more preferably from 30° C. to 100° C. The pressure is typically from subatmospheric to 50 bar.

Typical operating conditions for gas phase polymerizations are from 20° C. to 100° C., more preferably from 40° to 80° C. In gas phase processes, the pressure is typically from subatmospheric to 100 bar. Preferred gas phase polymerization processes are disclosed in U.S. Pat. Nos. 4,588,790, 4,543,399, 5,352,749, and 5,405,922, and U.S. application Ser. No. 122,582, filed Sep. 17, 1993 (corresponding to WO 9507942), which are hereby incorporated by reference.

In most polymerization reactions, the molar ratio of catalyst:polymerizable compounds employed is from $10^{-12}:1$ to $10^{-1}:1$, more preferably from $10^{-9}:1$ to $10^{-5}:1$.

At all times, the individual ingredients as well as the recovered catalyst components must be protected from oxygen and moisture. Therefore, the catalyst components and catalysts must be prepared and recovered in an oxygen- and moisture-free atmosphere. Preferably, therefore, the reactions are performed in the presence of a dry, inert gas such as, for example, nitrogen.

Advantageously, the polymerization process is carried out with a differential pressure of ethylene of from about 10 to about 1000 psi (70 to 7000 kPa), most preferably from about 40 to about 400 psi (30 to 300 kPa). The polymerization is generally conducted at a temperature of from 0° C. to 150° C., preferably from 70° C. to 150°C.

The polymerization may be carried out as a batchwise or a continuous polymerization process. A continuous process is preferred, in which event catalyst, olefin, polyene and, optionally, solvent are continuously supplied to the reaction zone and polymer product continuously removed therefrom. Preferably, the interpolymers are produced in a solution process, most preferably a continuous solution process.

Without limiting in any way the scope of the invention, one means for carrying out such a polymerization process is as follows: In a stirred-tank reactor, olefin monomer is introduced continuously together with solvent and polyene monomer. The reactor contains a liquid phase composed substantially of monomers together with any solvent or additional diluent. Catalyst and cocatalyst are continuously introduced in the reactor liquid phase. The reactor temperature and pressure may be controlled by adjusting the solvent/ monomer ratio, the catalyst addition rate, as well as by cooling or heating coils, jackets or both. The polymerization rate is controlled by the rate of catalyst addition. The polymer product molecular weight is controlled, optionally, by controlling other polymerization variables such as the temperature, monomer concentration, or by a stream of hydrogen introduced to the reactor, as is well known in the art. The reactor effluent is contacted with a catalyst kill agent such as water or an alcohol. The polymer solution is optionally heated, and the polymer product is recovered by flashing off gaseous monomers as well as residual solvent or diluent at reduced pressure, and, if necessary, conducting further devolatilization in equipment such as a devolatilizing extruder. In a continuous process, the mean residence time of the catalyst and polymer in the reactor generally is from about 5 minutes to 8 hours, and preferably from 10 minutes to 6 hours.

In a preferred manner of operation, the polymerization is conducted in a continuous solution polymerization system comprising at least two reactors connected in series or parallel. In one reactor, a relatively high weight average molecular weight ($M_w$) product ($M_w$ from 100,000 to 600,000) is formed, while in the second reactor, a product of a relatively low molecular weight ($M_w$ 10,000 to 200,000) is formed. The polyene is preferably introduced in the reactor producing the higher molecular weight interpolymer fraction using the catalysts system and relative feeding rates of polyene to olefin as described above. The catalyst used in the second reactor may be the same as or different from that in the first reactor. In particular, it could be a Ziegler-type catalyst, preferably a heterogeneous Ziegler catalyst containing a solid catalyst component comprising magnesium, titanium, halogen, and aluminum, optionally on a support material. When employing a Ziegler-type catalyst, reaction conditions typical for such catalyst are used in the relevant part of the process. The final product is a blend of the two reactor effluents which are combined prior to devolatilization to result in a uniform blend of the two polymer products. When incorporating the polyene in the higher molecular weight fraction, the desired properties can be achieved using less of the polyene. Such a dual reactor process further allows for the preparation of products having properties which may be improved selectively by varying certain reaction parameters and, thus, product properties independently. In a preferred embodiment, the reactors are connected in series, that is, effluent from the first reactor is charged to the second reactor and fresh monomers, solvent and hydrogen is added to the second reactor. Reactor conditions are adjusted such that the weight ratio of polymer produced in the first reactor to that produced in the second reactor is from 5:95 to 95:5. In addition, the temperature of the second reactor can be controlled to produce the lower molecular weight product. This system beneficially allows for the production of interpolymer products having a large range of mechanical, optical, and processing properties.

The interpolymer of the present invention may further comprise additives or adjuvants which are typically added to olefin-based polymers, such as fillers, antioxidants, colorants, UV stabilizers, flame retardants, etc.

The interpolymer of the present invention may be blended with other components such as natural or synthetic polymers, both thermoplastic and thermosetting. Typical polymers are styrenic polymers and styrenic block copolymers, olefinic polymers, ethylene vinyl alcohol copolymers, ethylene(meth)acrylic acid copolymers, polyesters, polyethers, and natural and synthetic rubbers.

Blending can be carried out by any conventional compounding operation, such as, for example, single- and twin-screw extruders, Banbury mixers, Brabender mixers, Farrel continuous mixers, and two-roll mixers. The order of mixing and the form of the blend components to be mixed is not critical. The mixing temperatures are preferably such that an intimate blend is obtained of the components. Typical temperatures are above the softening or melting points of at least one of the components, and more preferably above the softening or melting points of all the components.

The interpolymers of the present invention or their blend compositions may be used to fabricate articles, such as films, sheet, moldings, and other shaped articles by conventional processes, preferably under melt processing conditions. Suitable processes include injection molding, compression molding, blow-molding, extruding, rotational molding, and thermoforming. The present interpolymers can also be functionalized or grafted according to methods and techniques well known in the art.

It has been found that the present interpolymers having melt indices in the range of 0.05 to 1 g/10 min are suitable for processing according to blown film extrusion techniques to make very wide films, for example, agricultural films which may require bubble diameters of 3 m, or thick membranes such as used for landfills. This was not very well possible with prior art olefin-based polymers produced by coordination catalysts. Because of the advantageous properties, the present interpolymers can also be used in blow-molding applications, for example, to make bottles or containers having relatively larger dimensions. Interpolymers in the elastomeric range having a density of less than about 0.89 g/cm$^3$ are especially suitable for wire and cable applications, profile extrusion, and injection molded articles.

The present interpolymers can further be used to make foams or expandable products by combining them with an expanding agent and optionally subjecting the composition to expanding conditions. With the term "expanding agent" is meant an agent or compound which, while subjected to expanding conditions, such as, for example, heating, change of pressure, or application of mechanical force, undergoes a change in its physical or chemical condition, such as to occupy a greater volume. Preferred expanding agents are conventional blowing agents used to produce foams.

The invention will be further illustrated by the following examples, without limiting the invention thereto.

EXAMPLES

General Polymerization Method

The polymers described in the examples were produced in the following way. A continuous stirred tank reactor with a volume of five liters was used. Hydrogen, if added for control of melt index, was combined into one stream with the ethylene before being introduced into the diluent mixture. Typically, this diluent mixture comprises a mixture of $C_8$–$C_{10}$ saturated hydrocarbons (e.g., Isopar™ E, trademark of Exxon) and the optional α-olefin(s) and the diene. In the case of the examples described, 1-octene is used as α-olefin. The dienes 1,7-octadiene or 1,9-decadiene, if used, and the 1-octene were previously purified by passing them through silica and/or alumina molecular sieves. The reactor feed mixture is continuously introduced into the reactor. The transition metal complex and the cocatalyst, dissolved in the same solvent, were combined into a single stream and were also continuously injected into the reactor. The reactor pressure was held constant at about 30 bar. Temperature was controlled by the catalyst flow and by the use of a cooling jacket. The outlet stream of the reactor was taken to a heat exchanger where its temperature was raised to 270° C. and then to a devolatilizing unit where the solvent was separated from the polymer. The molten polymer was then carried to a pelletizer, where additives (e.g., antioxidants, pigments, etc.), if desired, were incorporated.

The catalyst/cocatalyst system used was {(tert-butylamido)dimethyl (tetramethyl-$\eta^5$-cyclopentadienyl)

silane} dimethyl titanium (IV) with tris(pentafluorophenyl) borane and isobutyl-modified methylalumoxane commercially available from Akzo Nobel under the designation MMAO, in the molar ratios 1:3:5 to 1:3:10, except for Example 14 where the transition metal compound was {(tert-butylamido)dimethyl(tetramethyl-$\eta^5$-cyclopentadienyl)silane} titanium (II) 1,3-pentadiene, the titanium being in the formal +2 oxidation state.

Typically, the following additives were employed in the examples and comparative examples: 50 to 2000 parts per million of Irganox™ B-900 and 100 to 2200 parts per million of calcium stearate. Irganox™ B-900 is available from Ciba-Geigy and is a mixture of 1 part of a phenolic-type antioxidant and 4 parts of a phosphite-type antioxidant.

The specific process conditions are incorporated in Table 1 and the product properties in Table 2. In the tables, the following abbreviations are used: OD for 1,7-octadiene; DD for 1,9-decadiene; Et for ethylene; H2 for hydrogen; and OCT for 1-octene. Examples 1–4 use OD and Examples 5–16 use DD. Comparative examples are indicted with "C-Ex".

The ethylene (Et) conversion in Table 1 is defined as the ratio (ethylene feed to reactor—ethylene out of the reactor) /(ethylene feed to reactor).

The process of Example 15 was carried out in two steps, the conditions of both steps being given in Table 1.

Table 2 provides both the values for the melt tension as measured and for the minimum melt tension as calculated according to formula:

$$MT\ min.=1.328-0.787910\ log(I_2) +22.5(d-0.85)-40.56\{log(I_2)\}\times (d-0.85).$$

Table 2 provides both the values for the DRI as measured and for the minimum DRI as calculated according to formula:

$$DRI\ min.=7-0.75*I_2.$$

Table 2 provides both the logarithmic value for the viscosity at a shear rate of 316 s$^{-1}$ and the logarithmic value for the maximum viscosity at that shear rate as calculated according to formula:

$$log\ \eta^{316}\ max.=2.80-0.2861\times log(I_2).$$

TABLE 1

Process Conditions of Examples and Comparative Examples

| | Diluent/ Et [kg/kg] | Et Feed [kg/hr] | OCT/ (OCT + ET) [wt %] | H2/Et [mole %] | Diene/ Et [mole/ mole] | Et Conversion [%] | Temperature [°C.] | Cat. Eff. [kg pol/ g Ti] |
|---|---|---|---|---|---|---|---|---|
| Ex. 1 | 9.5 | 2.50 | 52 | — | 0.0049 (OD) | 75.2 | 105 | 970 |
| Ex. 2 | 9.5 | 2.50 | 52 | — | 0.0051 (OD) | 73.1 | 111 | 1098 |
| Ex. 3 | 8.8 | 2.50 | 0.0 | 0.122 | 0.0075 (OD) | 92.0 | 136 | 160 |
| Ex. 4 | 8.4 | 2.50 | — | 0.127 | 0.0087 (OD) | 89.0 | 130 | 82 |
| Ex. 5 | 10.3 | 2.0 | 44 | — | 0.0013 (DD) | 85 | 100 | — |
| Ex. 6 | 10.1 | 2.0 | 35 | — | 0.0014 (DD) | 84 | 100 | — |
| Ex. 7 | 9.8 | 2.0 | 20 | — | 0.0013 (DD) | 84 | 100 | — |
| Ex. 8 | 7.9 | 3.0 | 15 | — | 0.0014 (DD) | 87 | 130 | — |
| Ex. 9 | 7.2 | 2.50 | — | — | 0.0017 (DD) | 85 | 130 | — |
| Ex. 10 | 9.5 | 2.50 | 52 | — | 0.0024 (DD) | 73.7 | 112 | 532 |
| Ex. 11 | 9.5 | 2.50 | 52 | — | 0.0020 (DD) | 80.5 | 108 | 698 |
| Ex. 12 | 9.5 | 2.50 | 52 | — | 0.0024 (DD) | 76.0 | 112 | 678 |
| Ex. 13 | 7.3 | 3.00 | — | 0.076 | 0.0005 (DD) | 89.0 | 130 | 366 |
| Ex. 14 | 8.8 | 4.0 | — | — | 0.0007 (DD) | 85.5 | 130 | — |
| Ex15 1st rect. | 9.3 | 1.8 | 11 | 0.084 | 0.001 (DD) | 85.4 | 130 | — |
| Ex15 2nd rect. | 6.4 | 2.6 | 12 | 0.060 | — | 86.0 | 128 | 165 |
| Ex. 16 | 6.0 | 4.0 | 17.5 | 0.072 | 0.0004 (DD) | 82.3 | 133 | — |
| C-Ex. 1 | 9.3 | 2.50 | 55 | — | — | 75.0 | 95 | 692 |
| C-Ex. 2 | 9.6 | 2.40 | 47 | — | — | 82.5 | 92 | 622 |
| C-Ex. 3 | 6.7 | 3.50 | 0.0 | 0.057 | — | 95.5 | 136 | 414 |
| C-Ex. 4 | 9.8 | 2.50 | 45 | — | — | 85.0 | 87 | 5323 |
| C-Ex. 5 | 9.4 | 2.50 | 51 | — | — | 78.4 | 94 | 3463 |

TABLE 2

Product Properties of Examples and Comparative Examples

| | Density [g/cc] | I2 [dg/min] | I10/I2 Ratio | Vinyls/ 1000 C | Vinylidenes/ 1000C | Trans-vinyls/ 1000C | Diene [mole %] | Melt Tension (g) | MT min. (g) | DRI | DRI min. | log ($\eta^{316}$) | log ($\eta^{316}$) max. |
|---|---|---|---|---|---|---|---|---|---|---|---|---|---|
| Ex. 1 | 0.867 | 4.0 | 11.1 | 0.29 | 0.44 | 0.22 | 0.3 | 2.7 | 0.8 | 5.2 | 4.0 | 2.44 | 2.63 |
| Ex. 2 | 0.877 | 2.1 | 11.4 | 0.30 | 0.41 | 0.23 | 0.34 | 4.3 | 1.3 | 7.8 | 5.5 | 2.61 | 2.71 |
| Ex. 3 | 0.951 | 1.9 | 12.3 | 0.31 | 0.05 | 0.05 | 0.62 | 4.3 | 2.2 | 9.5 | 5.6 | 2.67 | 2.72 |
| Ex. 4 | 0.944 | 1.7 | 14.6 | 0.18 | — | — | 0.67 | 3.5 | 2.4 | — | — | 2.53 | 2.73 |
| Ex. 5 | 0.876 | 0.4 | 19.0 | 0.15 | | | 0.11 | >10 | 2.7 | 7.8 | 6.7 | — | — |
| Ex. 6 | 0.885 | 1.2 | 13.4 | 0.21 | | | 0.12 | 3.6 | 1.9 | 11.9 | 6.1 | — | — |
| Ex. 7 | 0.909 | 1.1 | 14.3 | 0.20 | | | 0.11 | 4.0 | 2.6 | 10.5 | 6.2 | — | — |
| Ex. 8 | 0.920 | 1.1 | 16.6 | 0.33 | | | 0.11 | 11.4 | 2.7 | — | — | 2.51 | 2.79 |
| Ex. 9 | 0.952 | 0.1 | 31.2 | — | | | 0.12 | >12 | 8.6 | 4.8 | 6.9 | 2.80 | 3.09 |
| Ex.10 | 0.871 | 1.2 | 14.4 | 0.43 | — | — | 0.18 | 2.8 | 1.7 | 10.0 | 6.1 | 2.53 | 2.78 |
| Ex.11 | 0.867 | 4.6 | 10.7 | 0.45 | — | — | 0.16 | 4.4 | 0.7 | 5.3 | 3.6 | 2.41 | 2.61 |
| Ex.12 | 0.869 | 6.9 | 8.4 | 0.43 | — | — | 0.18 | 3.7 | 0.4 | 5.3 | 1.8 | 2.44 | 2.56 |
| Ex.13 | 0.956 | 1.7 | 14.3 | 0.14 | — | — | 0.04 | 3.4 | 2.5 | 6.7 | 5.7 | 2.53 | 2.73 |
| Ex.14 | 0.954 | 1.6 | 12.7 | 0.13 | 0.02 | 0.01 | 0.05 | 3.2 | 2.7 | 5.9 | 5.8 | 2.55 | 2.74 |
| Ex.15 | 0.924 | 2.1 | 10.8 | 0.18 | — | — | 0.03 | 2.6 | 1.8 | — | — | 2.64 | 2.71 |
| Ex.16 | 0.923 | 1.9 | 10.3 | 0.11 | — | — | 0.03 | 2.0 | 1.9 | — | — | 2.70 | 2.72 |
| C-Ex. 1 | 0.862 | 4.3 | 7.9 | 0.19 | 0.43 | 0.22 | — | 0.2 | 0.8 | 0.4 | 3.8 | — | — |
| C-Ex. 2 | 0.880 | 2.2 | 8.6 | 0.16 | 0.38 | 0.18 | — | 1.0 | 1.3 | 0.7 | 5.4 | — | — |
| C-Ex. 3 | 0.956 | 1.7 | 13.0 | 0.12 | 0.03 | 0.04 | — | 2.0 | 2.5 | 2.9 | 5.7 | — | — |
| C-Ex. 4 | 0.870 | 4.5 | 8.0 | 0.16 | 0.40 | 0.17 | — | 0.5 | 0.7 | 0.8 | 3.6 | — | — |
| C-Ex. 5 | 0.870 | 1.0 | 7.3 | — | | | — | 1.3 | 1.8 | 1.0 | 6.3 | — | — |

The significant improvement in the melt strength and DRI index in the interpolymers of the present invention follows from a comparison with comparative examples. With respect to Example 2, it is noted that even at an ethylene conversion which is significantly lower than the one used for Comparative Example 2, still the improvements in melt tension and DRI are significant.

The $M_w/M_n$ values for the interpolymers of Examples 13, and 4 were 2.7, and 2.7 respectively; for Comparative Examples 2, 3, and 4, respectively, 1.8, 2.4, and 2.0.

No ring structures were detected in Example 13, which is a polymer of ethylene and DD, or in any other equivalent copolymer or terpolymer of the same two monomers plus 1-octene by solution $^{13}$C-NMR. A comparison of Example 13 with 4 shows that to achieve about the same properties, the ethylene/1,7-octadiene copolymer with approximately equal melt index, melt tension and DRI requires about 23 times as much diene as the interpolymer of Example 13. Solution $^{13}$C-NMR shows the presence of 3.1 rings (C7 and C6) per thousand carbons in Example 4, while these or other rings are undetectable in Example 13.

A comparison between Examples 15 and 16 shows that using the same overall amount of polyene, in this case 1,9-decadiene, in either a process using two reactors in series (Example 15) or only one reactor, illustrates that an even more efficient use of the polyene can be obtained in the two-step polymerization process by introducing the polyene in the reactor making the higher molecular weight interpolymer fraction. At the same overall polyene/ethylene molar ratio, the interpolymer of Example 15 has a higher melt tension, even though its melt index is slightly higher.

The interpolymers of Examples 8, 15, and 16 were blown film extruded in a 45 mm screw extruder. The processability expressed as the torque applied to the extruder to keep the extruder running at a constant value of 40 rpm was, for the interpolymers of Examples 15 and 16, only 29 percent and 41 percent higher than for a standard LDPE of about the same melt index and density. The head pressure for the interpolymers of Examples 15 and 16 was the same and 21 percent higher, respectively, than that for the LDPE. Typical prior art linear low density polyethylenes (LLDPE) have torques which are about 80 to 90 percent higher than that of the standard LDPE. For typical LLDPE's, the head pressure is about 200 to 300 percent higher than for LLDPE. For a standard blown film blend of 70 weight percent of LLDPE and 30 weight percent of LDPE, the torque and head pressure are typically 60 percent and 80 to 90 percent higher, respectively, than for standard LDPE.

The interpolymer of Example 8 was extruded into a blown film using an extruder having a screw of 70 mm, a die diameter of 350 mm, and a die gap of 2.3 mm. The blow-up ratio (diameter of bubble to diameter of die) used was 2.5. Compared to a LDPE and a LLDPE of similar melt index and density, the interpolymer of Example 8 required: practically the same melt temperature as LDPE (192° C. to 195° C.) and a lower temperature than LLDPE (239° C.); a head pressure of 194 bar versus 209 bar for LDPE and 308 bar for LLDPE; and an amperage of 93 A versus 80 A for LDPE and 148 A for LLDPE.

What is claimed is:

1. An interpolymer comprising in polymerized form ethylene, an α-olefin containing 3 to 18 carbon atoms, and a non-conjugated α-omega diene having at least 7 carbon atoms and having two readily polymerizable double bonds, the amount of α-olefin containing 3 to 18 carbon atoms in the interpolymer being up to about 17 mole percent and the amount of non-conjugated diene in the interpolymer being from 0.005 to 0.7 mole percent, said interpolymer having a density, d, of from 0.85 to 0.97 g/cm$^3$ as measured in accordance with ASTM D-792;

a melt flow rate, $I_2$, from 0.001 to 50 g/10 min as measured in accordance with ASTM D-1238, Condition 190° C./2.16 kg; and the melt tension of the interpolymer satisfying the following relationship:

$$MT>1.328-0.7879 \log(I_2)+22.5(d-0.85)-40.56\{\log(I_2)\}\times(d-0.85)$$

wherein MT represents the melt tension in g.

2. The interpolymer of claim 1 wherein the diene is an α-omega diene containing from 10 to 18 carbon atoms.

3. The interpolymer of claim 2 wherein the diene is 1,9-decadiene.

4. The interpolymer of claim 3 wherein the diene content is in the range from 0.02 to 0.2 mole percent.

5. The interpolymer of claim 1 having a density of from 0.85 to 0.92 g/cm$^3$.

6. The interpolymer of claim 1 wherein the melt flow rate, I$_2$, is from 0.05 to 15 g/10 min.

7. The interpolymer of claim 1 having a molecular weight distribution, M$_w$/M$_n$, as determined by gel permeation chromatography from 1.8 to 5.

8. The interpolymer of claim 1 comprising units derived from ethylene, from an α-olefin with from 3 to 12 carbon atoms, and from 1,9-decadiene.

9. The interpolymer of claim 8 having a molecular weight distribution, M$_w$/M$_n$, as determined by gel permeation chromatography from 2.0 to 4.0.

10. The interpolymer of claim 1 satisfying the relationship $$MT > 1.7705 - 1.0504 \log(I_2) + 30.00(d-0.85) - 54.09\{\log(I_2)\} \times (d-0.85)$$

wherein MT, I$_2$, and d are defined as in claim 1.

11. The interpolymer of claim 1 comprising in polymerized form ethylene, an α-olefin containing 3 to 18 carbon atoms, and a non-conjugated α-omega diene having at least 10 carbon atoms and having two readily polymerizable double bonds, said interpolymer having a density, d, of from 0.85 to 0.92 g/cm$^3$ as measured in accordance with ASTM D-792; and a melt flow rate, I$_2$, from 0.05 to 15 g/10 min as measured in accordance with ASTM D-1238, Condition 190° C./2.16 kg.

12. The interpolymer of claim 11 wherein the diene is 1,9-decadiene.

13. An interpolymer according to claim 1 which further comprises constituent units derived from a polyene having only one readily polymerizable carbon-carbon double bond, which interpolymer is vulcanizable.

14. Composition comprising the interpolymer of claim 1 and one or more further natural or synthetic polymers.

15. Composition comprising the interpolymer of claim 1 and one or more additives or adjuvants.

16. Articles obtained by subjecting the interpolymer of claim 1 to melt processing conditions.

17. An interpolymer comprising in polymerized form ethylene, an α-olefin containing 3 to 18 carbon atoms, and a non-conjugated α-omega diene having at least 7 carbon atoms and having two readily polymerizable double bonds, the amount of α-olefin containing 3–18 carbon atoms in the interpolymer being up to about 17 mole percent and the amount of α-omega diene in the interpolymer being from 0.005 to 0.7 mole percent, said interpolymer having a density, d, of from 0.85 to 0.97 g/cm$^3$ as measured in accordance with ASTM D-792; and a melt flow rate, I$_2$, from 0.001 to 50 g/10 min as measured in accordance with ASTM D-1238, Condition 190° C./2.16 kg;

the interpolymer having a DRI index satisfying the following relationship (i) or (ii):
for interpolymers having an I$_2$<8:
(i) DRI>7−0.75*I$_2$, or for interpolymers having an I$_2$≧8:
(ii) DRI>1;
wherein DRI represents the Dow Rheology Index.

18. The interpolymer of claim 17 wherein the diene is an α-omega diene containing from 10 to 18 carbon atoms.

19. The interpolymer of claim 18 wherein the diene is 1,9-decadiene.

20. The interpolymer of claim 19 wherein the diene content is in the range from 0.02 to 0.2 mole percent.

21. The interpolymer of claim 17 having a density, d, of from 0.85 to 0.92 g/cm$^3$.

22. The interpolymer of claim 17 wherein the melt flow rate, I$_2$, is from 0.05 to 15 g/10 min.

23. The interpolymer of claim 17 having a molecular weight distribution, M$_w$/M$_n$, as determined by gel permeation chromatography from 1.8 to 5.

24. The interpolymer of claim 17 comprising units derived from ethylene, an α-olefin with from 3 to 12 carbon atoms, and 1,9-decadiene.

25. The interpolymer of claim 24 having a molecular weight distribution, M$_w$/M$_n$, as determined by gel permeation chromatography from 2.0 to 4.0.

26. The interpolymer of claim 17 comprising in polymerized form ethylene, an α-olefin containing 3 to 18 carbon atoms, and a non-conjugated α-omega diene having at least 10 carbon atoms and having two readily polymerizable double bonds, said interpolymer having a density, d, of from 0.85 to 0.92 g/cm$^3$ as measured in accordance with ASTM D-792; and a melt flow rate, I$_2$, from 0.05 to 15 g/10 min as measured in accordance with ASTM D-1238, Condition 190° C./2.16 kg.

27. The interpolymer of claim 26 wherein the diene is 1,9-decadiene.

28. An interpolymer according to claim 17 which further comprises constituent units derived from a polyene having only one readily polymerizable carbon-carbon double bond, which interpolymer is vulcanizable.

29. A process of preparing an interpolymer comprising in polymerized form ethylene, an α-olefin containing 3 to 18 carbon atoms, and a non-conjugated α-omega diene having at least 7 carbon atoms and having two readily polymerizable double bonds, the amount of α-olefin containing 3 to 18 carbon atoms in the interpolymer being up to about 17 mole percent and the amount of non-conjugated diene in the interpolymer being from 0.005 to 0.7 mole percent, by interpolymerizing in a polymerization reactor ethylene, the α-olefin containing 3 to 18 carbon atoms and the diene in the presence of a transition metal catalyst comprising a transition metal compound containing at least one π-bonded anionic ligand group, wherein the molar ratio of diene to ethylene in the feed to said polymerization reactor is from 0.00005 to 0.02.

30. The process of claim 29 wherein the diene is an α-omega diene containing from 10 to 18 carbon atoms.

31. The process of claim 29, wherein the diene is 1,9-decadiene.

32. The process of claim 29 comprising interpolymerizing ethylene, an α-olefin with from 3 to 12 carbon atoms, and 1,9-decadiene.

33. The process according to claim 32 wherein the mole ratio of 1,9-decadiene to ethylene in the feed to the polymerization reactor is from 0.0001 to 0.005 mole of 1,9-decadiene per mole of ethylene.

34. The process of claim 32 wherein the mole ratio of the α-olefin containing 3 to 18 carbon atoms to ethylene in the feed to the reactor is from 0 to 0.3 mole of α-olefin per mole of ethylene.

35. The process according to claim 29 which is a solution, gas phase, or slurry polymerization process.

36. The process according to claim 35 which is a solution process conducted at a temperature of 0° C. to 150° C. in an inert diluent.

37. The process of claim 29 wherein the π-bonded anionic ligand group of the transition metal compound is a Group 4 metal coordination complex corresponding to the formula:

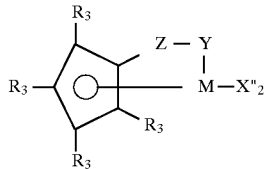

wherein:

M is titanium or zirconium in the +2 or +4 formal oxidation state;

$R_3$ in each occurrence independently is selected from the group consisting of hydrogen, hydrocarbyl, silyl, germyl, cyano, halo and combinations thereof, said $R_3$ having up to 20 non-hydrogen atoms, or adjacent $R_3$ groups together form a divalent derivative selected from the group consisting of hydrocarbadiyl, siladiyl and germadiyl thereby forming a fused ring system, each X" is a halo, hydrocarbyl, hydrocarbyloxy or silyl group, said group having up to 20 non-hydrogen atoms, or two X" groups together form a $C_{5-30}$ conjugated diene;

Y is —O—, —S—, —NR*—, —PR*—; and

Z is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein: R* independently each occurrence is hydrogen or a group selected from silyl, hydrocarbyl, hydrocarbyloxy and combinations thereof, said R* having up to 30 carbon or silicon atoms.

38. The process of claim 37 wherein the transition metal compound is catalytically activated by combination with an activating cocatalyst selected from the group consisting of polymeric or oligomeric alumoxanes, neutral Lewis acids, non-polymeric, compatible, non-coordinating, ion-forming compounds, and combinations thereof.

39. The process according to claim 29 wherein the interpolymerization takes place in the presence of a polyene having only one readily polymerizable carbon-carbon double bond.

\* \* \* \* \*